(12) United States Patent
Britz et al.

(10) Patent No.: US 8,515,294 B2
(45) Date of Patent: Aug. 20, 2013

(54) METHOD AND APPARATUS FOR PROVIDING BEAM STEERING OF TERAHERTZ ELECTROMAGNETIC WAVES

(75) Inventors: David Britz, Rumson, NJ (US); Robert R. Miller, Convent Station, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 336 days.

(21) Appl. No.: 12/908,534

(22) Filed: Oct. 20, 2010

(65) Prior Publication Data

US 2012/0099856 A1    Apr. 26, 2012

(51) Int. Cl.
*H04B 10/06* (2006.01)

(52) U.S. Cl.
USPC .......................... 398/212; 398/124; 398/130

(58) Field of Classification Search
USPC .......................... 398/118–119, 124–130, 212
See application file for complete search history.

(56) References Cited

U.S. PATENT DOCUMENTS

| | | | |
|---|---|---|---|
| 5,359,669 | A | 10/1994 | Shanley et al. |
| 7,197,248 | B1 | 3/2007 | Vorontsov et al. |
| 7,221,931 | B2 | 5/2007 | Benco et al. |
| 7,768,380 | B2 | 8/2010 | Breed et al. |
| 8,126,467 | B2 | 2/2012 | Choi et al. |
| 8,213,022 | B1 | 7/2012 | Riza et al. |
| 2006/0114170 | A1 | 6/2006 | Sievenpiper |
| 2008/0013071 | A1* | 1/2008 | Tsumura et al. ................ 356/51 |
| 2008/0147409 | A1 | 6/2008 | Taormina |
| 2008/0245872 | A1 | 10/2008 | Good |
| 2008/0285032 | A1* | 11/2008 | Ohkubo ........................ 356/343 |
| 2009/0088203 | A1 | 4/2009 | Havens et al. |
| 2009/0163175 | A1 | 6/2009 | Shi et al. |
| 2010/0067918 | A1* | 3/2010 | Federici et al. ............... 398/158 |
| 2010/0102233 | A1* | 4/2010 | Gelmond .................. 250/341.1 |
| 2010/0165431 | A1 | 7/2010 | Li et al. |
| 2010/0166430 | A1 | 7/2010 | Alten |
| 2011/0008062 | A1 | 1/2011 | Ashdown |

(Continued)

FOREIGN PATENT DOCUMENTS

| | | |
|---|---|---|
| EP | 1 596 470 A1 | 11/2005 |
| EP | 1 816 491 A1 | 8/2007 |

(Continued)

OTHER PUBLICATIONS

International Search Report and Written Opinion for PCT/US2010/053320, Jan. 27, 2011, copy consists of 12 unnumbered pages.

(Continued)

*Primary Examiner* — Dzung Tran

(57) ABSTRACT

A method and apparatus for establishing a terahertz link using a multi-element lens array that comprises a plurality of active beam steering device are disclosed. For example, the method receives detected terahertz signals from one or more detectors, where an active beam steering device is deployed with each of the one or more detectors, and determines, for each of the detected signals, if the detected signal is out of focus from a focus point. The method applies a corrective signal to each active beam steering device that corresponds to a detected terahertz signal that is out of focus from the focus point, wherein the corrective signal causes the detected signal to be redirected, and measures a signal-to-noise ratio of the detected signals. The method then establishes the terahertz link via at least one of the detected terahertz signals with a highest signal-to-noise ratio.

20 Claims, 6 Drawing Sheets

(56) References Cited

U.S. PATENT DOCUMENTS

2011/0133087 A1* 6/2011 Mann et al. ............... 250/338.4
2011/0293268 A1* 12/2011 Britz et al. ................. 398/26
2012/0099856 A1    4/2012 Britz et al.

FOREIGN PATENT DOCUMENTS

| EP | 2 076 071 A1 | 1/2009 |
| WO | WO 00/31679 | 6/2000 |
| WO | WO 2006/023195 A2 | 3/2006 |
| WO | WO 2006/055798 A1 | 5/2006 |
| WO | WO 2007/088453 A1 | 9/2007 |
| WO | WO 2008/121159 A2 | 10/2008 |

OTHER PUBLICATIONS

S. Kuiper et al., "Variable-focus liquid lens for miniature cameras," Applied Physics Letters, AIP, American Institute of Physics, vol. 85, No. 7, Jan. 1, 2004, pp. 1128-1130.

International Search Report and Written Opinion for PCT/US2010/053311, Jan. 13, 2011, copy consists of 12 unnumbered pages.

* cited by examiner

METHOD AND APPARATUS FOR PROVIDING BEAM STEERING OF TERAHERTZ ELECTROMAGNETIC WAVES

The present disclosure relates generally to communication using a terahertz link and, more particularly, to a method for providing communication over a terahertz link using a multi-element lens array that comprises a plurality of active beam steering filters.

BACKGROUND OF THE DISCLOSURE

The increasing utilization of mobile personal devices, e.g., cell phones, smart phones, etc., has dramatically increased network traffic. For example, fully one billion people worldwide are Internet users with a large portion of this population accessing the Web through their mobile phones. In addition, the behavior of mobile phone customers has changed in recent years. The number of users accessing media-rich data and social networking sites via mobile personal devices has risen dramatically. For example, the average owner of a smart phone today transacts three times the amount of data than did early smart phone users. Consequently, there is a need to continually grow the network capacity to accommodate the ever increasing traffic.

But as is often the case, with great success also comes great challenges. For example, some cellular service providers are struggling to keep up with demand and they are placing limits on data usage to conserve network bandwidth and spectrum. This industry pushback is clearly a reaction to the recognition of the bandwidth and capacity limits of existing cellular systems. However, placing limits on data usage is an unpractical approach to reduce demand, which also reduces revenue for the service provider and creates dissatisfaction for customers.

SUMMARY OF THE DISCLOSURE

In one embodiment, the present disclosure teaches a method and apparatus establishing a terahertz link using a multi-element lens array that comprises a plurality of active beam steering devices. For example, the method receives detected terahertz signals from one or more detectors, where an active beam steering device is deployed with each of the one or more detectors, and determines, for each of the detected signals, if the detected signal is out of focus from a focus point. The method applies a corrective signal to each active beam steering device that corresponds to a detected terahertz signal that is out of focus from the focus point, wherein the corrective signal causes the detected signal to be redirected, and measures a signal-to-noise ratio of the detected signals. The method then establishes the terahertz link via at least one of the detected terahertz signals with a highest signal-to-noise ratio.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
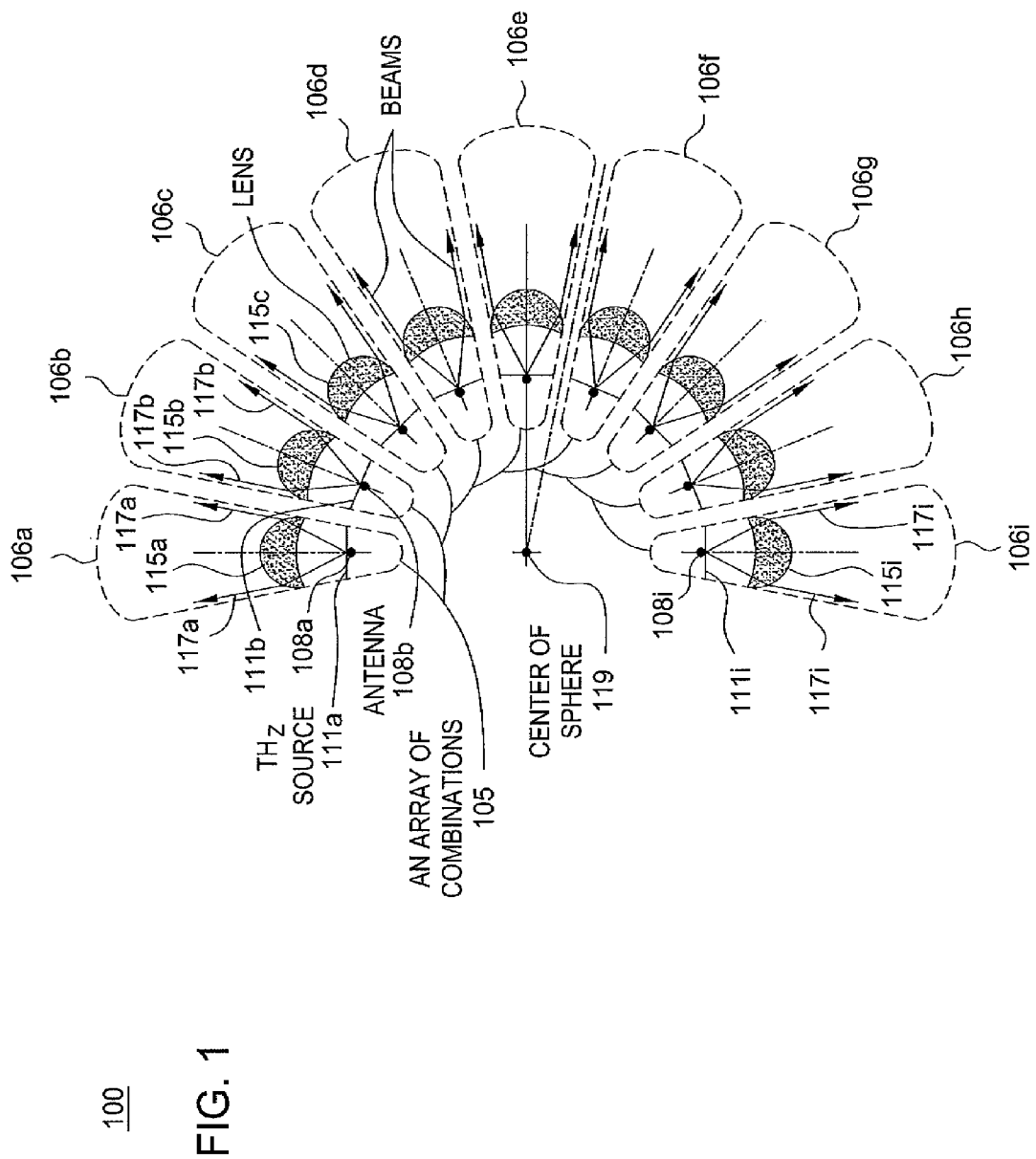
FIG. 1 illustrates a sectional view of a transmitter with a fly's eye structure.

The present disclosure broadly teaches a method and apparatus for providing communication over a terahertz link using a mobile communication device having a multi-element lens array that comprises a plurality of active beam steering filters, e.g., holographic filters or micro-mirrors, that is capable of communicating with a network, e.g., via a base station. In turn, the communication can be extended into the network, thereby allowing the mobile device to access various services over the network. Although the present disclosure is discussed below in the context of wireless networks, e.g., cellular networks, the present disclosure is not so limited. Namely, the present disclosure can be applied to all networks that would benefit from improved control of a directionality of terahertz signals transmitted to and from mobile devices, e.g., laptops, mobile phones, and the like.

In one embodiment, the current method enables expansion of network capacity by employing wireless Local Area Networks (LANs) that operate in a terahertz (THz) spectrum. Devices that operate in the THz spectrum by definition use a Terahertz frequency. A critical consideration for using THz frequencies is related to the sizes of the terahertz antennas. The wavelength of a waveform whose frequency is in the order of a THz is very small. As the wavelength becomes smaller, the antenna's aperture, (i.e., the area over which the antenna collects or launches an electromagnetic wave), is correspondingly reduced. Conventional microwave cellular radios have antennas that are on the order of inches in length. But as wavelengths get smaller, and especially in the higher frequency domains of THz frequencies, antennas can shrink to literally microscopic proportions. The proportion of radio energy intercepted and collected by so small an antenna is quite small, dramatically reducing the reach of signals transmitted over terahertz frequency.

One approach for improving the reach of transmitted signals is to place a lens, e.g., a dielectric lens, in front of the transmitting and receiving antennas. The combination of the antenna and lens has an improved gain. Unfortunately, the improvement in the gain comes at a cost in terms of directionality. Specifically, a signal (also referred to as a beam) transmitted by a combination of an antenna and a lens (placed in front of the antenna) is highly directional and may in extreme arrangements result in a fully collimated or "pencil" beam. Transmission configurations where there is no preferred direction (directivity) and radiate the signal in a spherical or torroidial emission are referred to as an omni-directional signal transmissions. Transmission configurations with beam divergences configured between omni-directional and collimated are referred to as sectored beam transmissions.

Furthermore, the gain of the lens increases as the solid angle (measured in steradians) illuminated by the antenna decreases, to a point where the maximum signal gain is achieved with a collimated (pencil) beam, and achieving the smallest focus point by the geometric collecting lens (or mirror) and providing the most concentrated signal. In order to achieve a high gain, the solid angle illuminated by the antenna has to become quite small. The highly directional nature of the transmitted signal and the need to minimize the solid angle illuminated by the antenna, to achieve the desired gain, create a challenge for beam alignment between the transmitter and receiver antennas as well as between the receivers antenna collecting optics and the actual electrical signal detector. For example, with such signal to detector misalignment possible between link ends as well as within the receiver configuration itself, a mobile device, e.g., a mobile phone, attempting to communicate with a base station over a THz frequency, the transceivers in the Mobile phone and the base station may not succeed in establishing a communications link, or if so, for only a short duration before motion between the link ends misaligns the optimum line-of-sight between them.

In one embodiment, the current method teaches a beam alignment (signal alignment) between the transmitter and receiver antennas using a spherical structure and a hemispherical structure for the transmitting and receiving antennas, respectively. The transmitter and receiver may be combined to share circuitry and housing. In such embodiment, the combination of the transmitter and receiver is referred to as a transceiver. A system that utilizes multiple transceivers in an array that is configured in a spherical or hemispherical arrangement for transmitting and receiving is also generally referred to as a fly's eye structure.

The spherical arrangement of multiple transceivers is used for transmitting a plurality of signals, with each signal aimed outward from the center of the sphere, such that the plurality of the signals covers as near practically possible an entire three dimensional space. Similarly, the hemispherical or near hemispherical transceiver structure is used for receiving and transmitting a plurality of signals from a more defined coverage area, with each signal being received by a combination of an antenna and a beam steering device. The hemispherical structure for receiving a plurality of signals may be a cluster of receivers, wherein each receiver has a combination of an antenna and a beam steering device. In one embodiment, the combined field of view of all of the receivers in a cluster covers a hemisphere or a near hemisphere.

In one embodiment, the current method teaches using individual integrated transceivers directly behind a combination of an antenna and a beam steering device. The individual integrated transceivers are connected to the combination of the antenna and the beam steering device, wherein the beam steering device is made of one or more active beam steering filters.

FIG. 1 illustrates a sectional view of a transmitter 100 with a fly's eye structure. In one embodiment, the transmitter 100 comprises an array 105 of a plurality of combinations 106$a$-106$i$, wherein each of the combinations 106$a$-106$i$ comprises a corresponding THz source 108$a$-108$i$ connected to an antenna 111$a$-111$i$, and an active beam steering filter 115$a$-115$i$. For example, the combination 106$a$ comprises a THz source 108$a$ connected to an antenna 111$a$, and an active beam steering filter 115$a$. Similarly, the combination 106$b$ comprises a THz source 108$b$ connected to an antenna 111$b$, and an active beam steering filter 115$b$, and so on. Each of a plurality of signals 117$a$-117$i$ is aimed outward from a center of the sphere 119.

The combination of: (1) transmitting using many directed signals; and (2) receiving using a cluster of receivers, increases the likelihood of establishing a link between a transceiver in a mobile device and another transceiver, e.g., in a base station. Specifically, a signal from among all the signals received by the cluster of receivers may be selected. For the example above, a transceiver in a device may detect one of more of the plurality of signals 117$a$-117$i$ transmitted by another device that will be collected and directed by the collecting lens 221$a$ and directed to the transceivers focus point and signal detector. One of the plurality of signals 117$a$-117$i$ may then be selected by the receiving device.

It should be noted that in one embodiment, a predefined beacon signal can be used such that a transmitter and a receiver may perform a handshake operation to assist in the establishment of a THz link between the transmitter and the receiver. Alternatively, each combination as discussed in FIG. 1 may simultaneously broadcast a signal and a THz link is established based on a Signal-To-Noise Ratio (SNR) computation as discussed below, i.e., the THz link with the best SNR (line of sight), will be selected.

In one embodiment, the service provider may configure a plurality of criteria for selecting a particular signal. For example, the selection may be based on avoidance of link shadowing, Signal-To-Noise Ratio (SNR), etc. SNR refers to a measure of signal strength relative to background noise usually measured in decibels (dB). For example, the SNR for each of the signals received by the cluster of receivers can be measured and the signal with the highest SNR will be selected.

However, the user of the mobile device may change his/her location and may lose a connection. Hence, maximizing the reach of the system may need active steering of the highly directional signals based on a positional relationship between a transceiver in the mobile device and a transceiver in the base station. Furthermore, as described above, receivers operating in THz frequencies have very small aperture (e.g., in the order of microns in diameter). Therefore, each steering device implemented in the cluster of receivers may need to "actively" accurately focus the collected THz energy onto a small detector.

However, as described above, THz frequencies travel very short distances. The near-field nature of the THz transmitters and receivers has the following challenges:

A slight movement of the transceivers will change the focal point of the received signal (beam);

The receiving steering device may steer a focusing signal (beam) to a focus spot which is offset from the small detector area of the receiver, possibly failing to illuminate the detector entirely; and If the focus spot moves away from the ideal optical axis (i.e., the transmitted signal and steering device axis are not perfectly aligned), the resulting focus spot may be distorted, many times larger and of lower average energy, than the ideally designed focal spot, rendering a lower link margin.

In one embodiment, the current method teaches an active and adaptive control of the focus point (spot) using a steering device to optimize THz signal detection. In one embodiment, the steering device comprises one or more active beam steering filters, e.g., holographic filters or micro-mirrors.

It should be noted that the relation between the object "point" source and its resulting image at the focal plane behind a simple plan convex lens is a relationship of proportionality between the point source's distance to and the lens's focal length. This proportional relationship expresses itself in two critical consequences; focal depth and focal plane displacement. It should be noted that broadly the focal point of a lens is not a perfect infinitely small point, but is an airy disk that is produced by the diffraction and destructive interference of the converging rays from the lens arriving at the common focal depth (point of focus along the optical axis). The size of the airy disk is controlled by the relationship between the lens diameter and its focal length—its focal ratio.

The optical axis is the imaginary line that runs through the center of the lens, extending both in front of and behind the lens.

It should be noted with respect to focal depth that if an object or luminance point source is sufficiently far away from a lens such that its emitted or reflected light arrives at the lens essentially parallel (collimated), the focal position of the source image will be at half the lens's mechanical radius of curvature. If on the other hand, the source is much closer such that the source's emitted or reflected light is arriving at the lens in a divergent spreading manner then the resulting position of the focus point will move back from the lens away from the initial collimated focal point. This backward motion of the lens focus continues until the source reaches a distance in front of the lens equal the lenses collimated focal length at which point the lenses focal point is at infinity and the lens emitted rays exit the back of the lens parallel (collimated) and never again reaching a point of focus. Thus for the source and lens systems and for any arrangement other than collimated light, as the source moves toward the lens the resulting focus point will accordingly move backward. If a source detector is placed at the ideal collimated focal point of the lens, then as the source moves toward the lens the resulting focal point will move backward in relation to the lens collimated focal point and the detector will suffer a defocusing image of the source that spreads the energy of the source (captured by the lens) over an increasingly larger area, reducing the detected SNR.

It should be noted that with respect to focal plane displacement, that similarly to focal depth, the position of the sources resulting image location is proportional to the sources location to the optical axis (the imaginary line running through the center of the lens). If ideally the source is exactly on the optical axis at some distance from the lens, then the resulting image behind the lens will be projected onto the optical axis behind the lens. If the source is moved off the optical axis then the lens will form an image the source proportionally offset to the optical axis at the lens focal plane, but on the other side of the optical axis to the source itself. As the source moves further off the optical axis, the resulting image of the source continues to move away from the optical axis and the ability of the lens to converge all the rays to a diffraction (airy) point (that make up the image of the source) breaks down and the rays increasingly arrive at different focal plane locations. The resulting focal point spreads and expands from an ideal airy disk (minimum size of the diffraction spot) to a diffuse and distorted image of the original source away from the optical axis (e.g., shown as 228 in FIG. 2) and detector.

Thus it can be easily understood that a free moving source moving both in distance from the lens as well as from the lens's optical axis will produce a focal point behind the lens that is in itself moving in proportion to the source. If a fixed detector is placed at the optimum collimated focal point, then with the dynamically moving source the fixed detector will suffer significant SNR loss resulting from the inherent wandering and defocusing of the focus point. These SNR loss conditions can also be experienced in line-of-sight communication systems where one or both link transceivers are moving in relation to each other.

In one embodiment, the current method teaches an active and adaptive control of the focus point (spot) using a steering device to optimize THz signal detection. More specifically, the current method is able to control the focus point to address the received THz signal being out of focus and/or out of position as discussed above.

Amplitude transmission holographic images have an interference pattern (fringe) that recreates some of the properties of the object being imaged such as three-dimensional image shape and proportions. If in the case of an optical lens, a hologram is created from the passage of an illumination (scatter) beam through the lens, when the hologram is later illuminated by another reference beam, the recorded interference pattern will modify the reference beams outgoing path creating a virtual image of the original lens as well as duplicating the refractive and focusing powers of the lens. Thus, if a holographic virtual image is taken of an optical lens, the resulting hologram of the lens is also able to focus light to an image point similar to that of the original optical lens.

The phenomenon of holographic virtual imaging is not unique to a particular electromagnetic frequency. Thus, with any suitable collimated sources and interference recording (fringe forming medium), a hologram could be made for virtually any electromagnetic frequency. Accordingly, with a suitable holographic medium, a THz "holographic lens" can be fabricated that acts on THz energy from a source and further shapes the THz beam into a beam profile suitable for use in a THz communications system.

Holograms also have another intrinsic property in that holograms can bend a beam, steering it to a target much the same way as the hologram's fringe pattern can converge (bend) ray paths to a focus. Thus, if a series of coordinated "virtual image" holograms were arranged in sequence and then sequentially illuminated, the sequence of holograms could be used to redirect a THz beam to one or more targets. This unique approach allows a steering device employing the holographic lens to behave like an optical switch.

In one embodiment, a holographic filter is made from permanent recording media, such as a high resolution film or formable transparent plastic films. Alternatively, in one embodiment, a spatial light modulator (SLM) optimized for THz frequencies, can be employed to bring about complicated patterns of phase variation that can be used to produce diffractive optical elements, such as dynamic virtual lenses, for THz beam focusing or THz signal aiming. In one embodiment, dynamic phase variation can also produce real-time holograms. Devices permitting detailed addressable phase control over two dimensions are considered to be a type of spatial light modulator.

Figure 6:
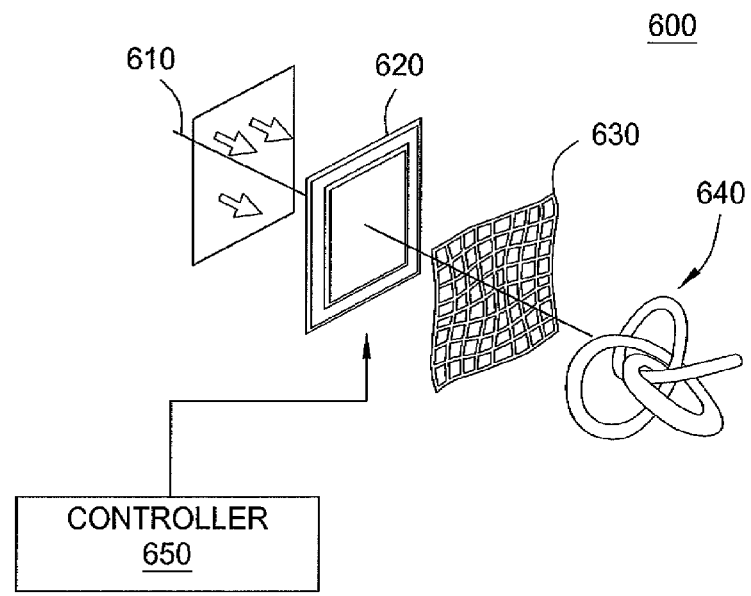
FIG. 6 illustrates an exemplary spatial light modulator system to provide computer generated holography.

FIG. 6 illustrates an exemplary spatial light modulator system 600 to provide computer generated holography. For example, spatial light modulator system 600 may receive an input light wave 610, e.g., a laser wavefront. The input light wave 610 is then interacted with a SLM holographic pattern (broadly a computer calculated holographic fringe pattern) for display by the SLM to produce a diffracted wavefront that will yield an interactive 3D image 640, i.e., a hologram. In one embodiment, the holographic fringe pattern is generated and altered under the control of the controller 650 (broadly a computer or a processor). In one embodiment, spatial light modulator system 600 can be used to focus or aim a THz signal as discussed below. Thus, non-linear photorefractive crystals and electrical and optically addressed spatial light modulators (SLMs) are examples of active beam bending systems that can be adapted for terahertz frequencies.

In one embodiment, the active beam steering filters can be implemented using micro-mirrors. For example, a digital micro-mirror array device may have a plurality of micro-mirror surfaces implemented on an optical semiconductor that includes on its surface, multiple (e.g., several hundred to many thousands) of microscopic mirrors arranged, e.g., in a rectangular array. The THz beam is directed onto the micro-mirror surface. Individual micro-mirrors within this array can be programmed and controlled using linear displacement and tilt to individually direct their part of the intercepted THz beam to a point of common convergence (focus) at the receiver as discussed below, means to control wave phase by a piston capability within the individual micromirror is well documented.

In addition to active focus control, active beam steering methods are necessary to also steer and keep the focused beam on the THz receiver. This becomes important when considering randomly placed receivers that may not be positioned optimally for maximum transmitter receiver beam alignment. For example, with handheld devices, hand position and motion may induce angular changes in signal arrival from the transmitter. At the receiver focal plane, the moving transmitted beam may cause the resulting focus spot to move around the receptor element surface, often missing receptor altogether. A wide angle receiving lens will help to reduce the apparent angular displacement that would occur at the receiver surface due to this motion but, being a fixed element it would not be capable of eliminating focus spot wandering as well as robbing link margin by reducing antenna gain for such a small THz receiver. Thus, beam steering techniques used for focus control could also be used to control the wandering of the focus spot, i.e., keeping the converging beam directed at and locked on the receiver.

In one embodiment, the steering device is positioned before each of the detectors (e.g., terahertz detectors) of the fly's eye structure. A terahertz detector is a receiving device capable of detecting terahertz frequencies and converting their contained electromagnetic energy into the electrical domain so that the contained signal modulation may be detected and processed electrically. In one embodiment, a software or electronic system controls the steering device having at least one holographic filter, thereby adjusting the focusing power of the received terahertz signal.

Figure 2:
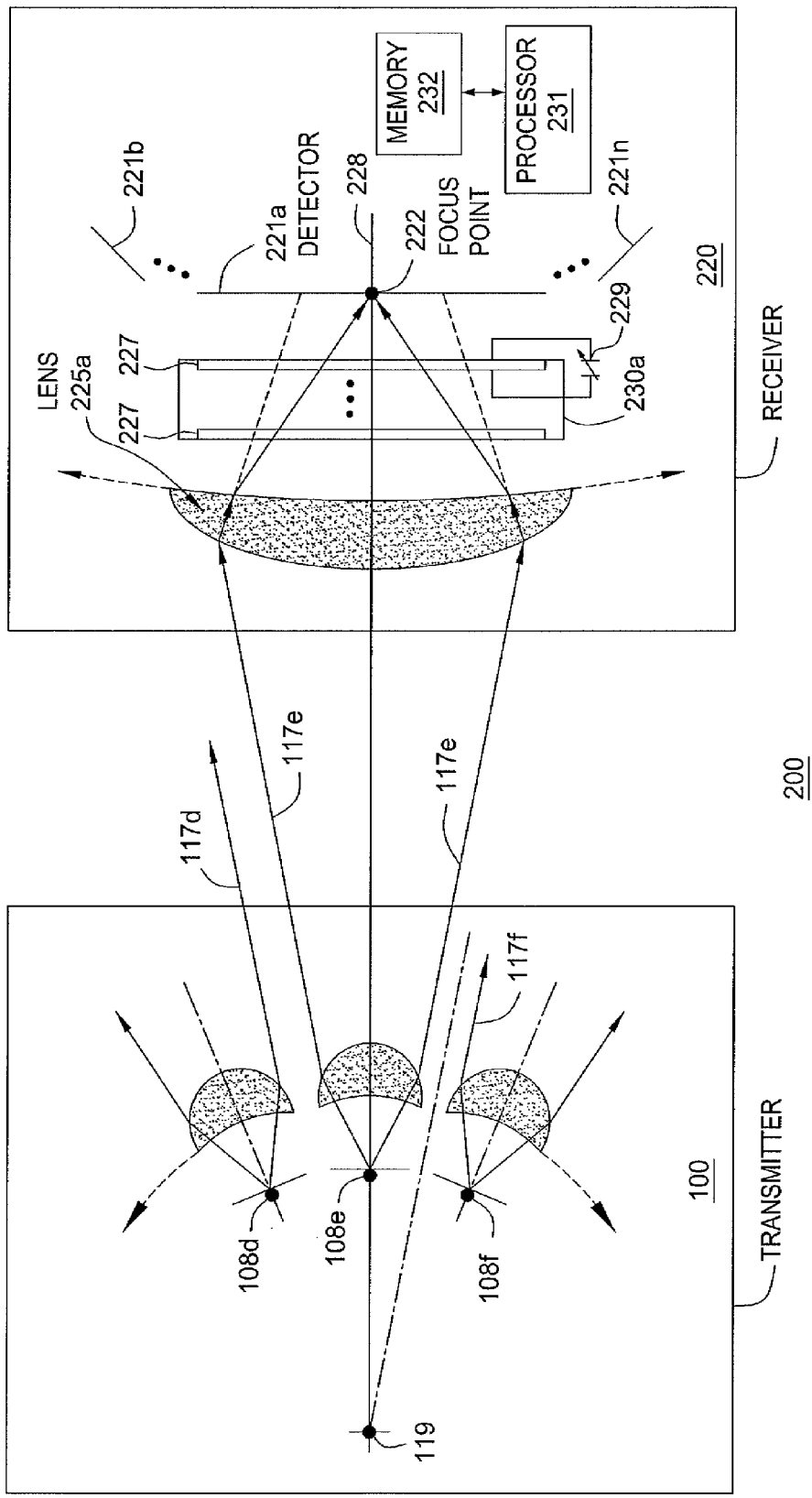
FIG. 2 illustrates an exemplary communications link established between the transmitter and a receiver.

FIG. 2 illustrates an exemplary communications link 200 established between the transmitter 100 and a receiver 220. It should be noted that a transmitter and receiver can be implemented as a combined device, e.g., a transceiver. As such, components that are discussed in the context of a receiver can be implemented in a transmitter and vice versa, and as a general rule, optics are bidirectional.

In one embodiment, the receiver 220 comprises an array of a plurality of combinations, wherein each of the combinations comprises an optional lens 225a-n, and steering device 230a-n positioned in front of its detectors 221a-n. It should be noted that lens 225a-n can be omitted in certain embodiments where the active steering devices are deployed without the need of any additional optics.

It should be noted that although only one combination is shown in the receiver 220 for clarity reasons, there are in fact a plurality of such combinations that can be configured into a hemispherical configuration or a hemispherical configuration. Each of the steering device 230a-n comprises one or more active beam steering filters 227, e.g., holographic filters or micro-mirror filters.

In one embodiment, the variable voltage source 229 interacts with the one or more active beam steering filters 227 to focus the signals 117e onto the focus point 222 onto a THz detector 221. The use of the steering device 230a focuses the signals 117e onto the focus point 222 onto a THz detector 221a. For example, if the focus point of signal 117e is off-set, then the one or more active beam steering filters 227 are dynamically adjusted via a processor 231 to ensure the signal is focused back at the focus point 222. It should be noted that each steering device comprises one or more active beam steering filters 227. The operation of the one or more active beam steering filters 227 are described further below.

Note that any number of the plurality of signals 117a-117i may be received. For example, another detector (not shown) may receive the signal 117d. The combination of: (1) transmitting using many directed signals; and (2) receiving using a cluster of receivers, increases the likelihood of establishing a link between a transceiver in a mobile device and a transceiver in a base station. Specifically, a signal from among all signals received by the cluster of receivers can be selected. For the example above, a transceiver in a device may detect one or more of the plurality of signals 117a-117i transmitted by another device. One, or group of the signals 117a-117i may then be selected by the receiving device or devices based on the SNR of a single optimize (aligned link) or using established methods for aggregating signals from multiple receiver signals for optimizing the transmission link.

Figure 3:
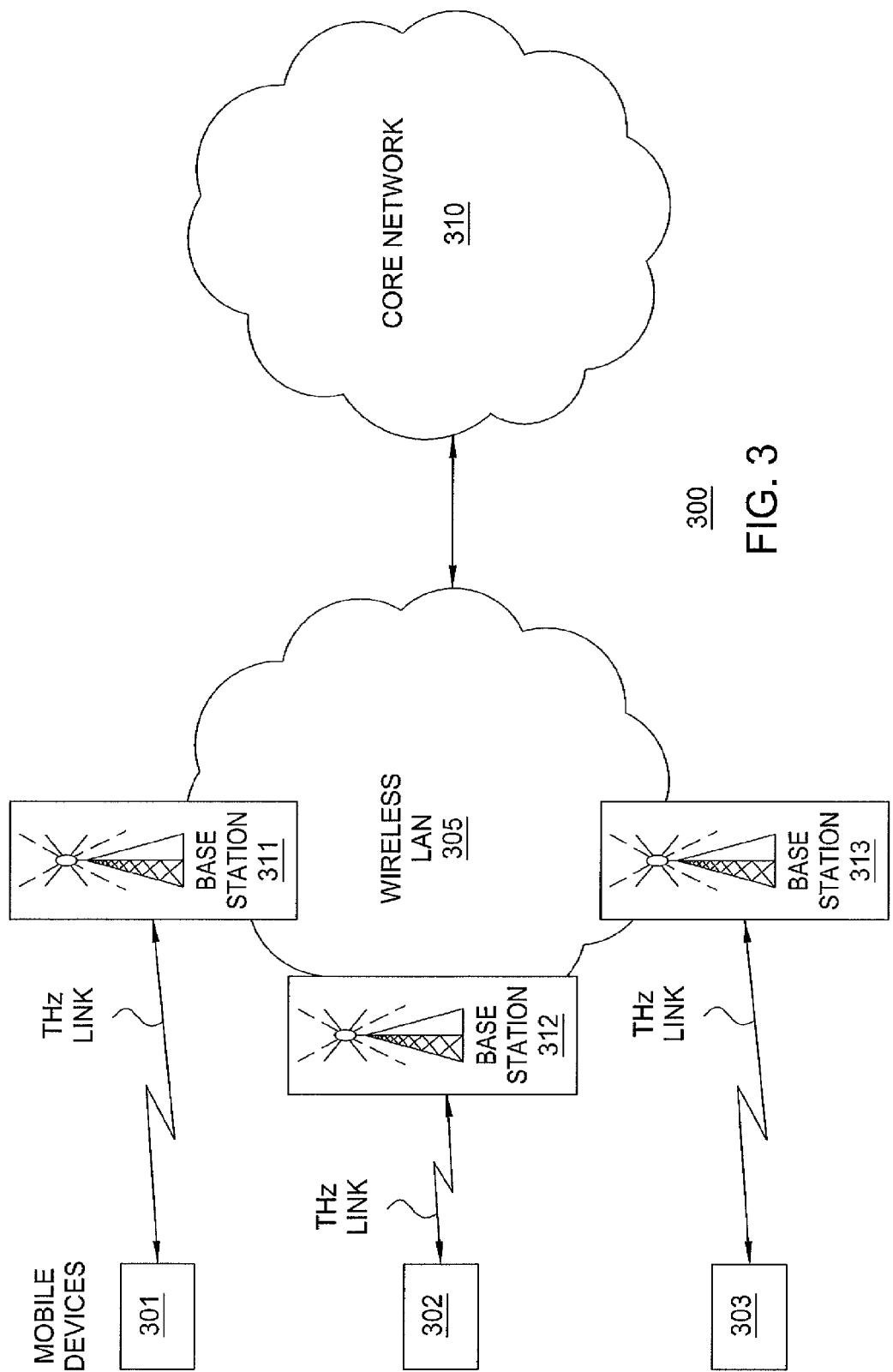
FIG. 3 illustrates a block diagram depicting an exemplary network related to the current disclosure.

FIG. 3 illustrates a block diagram depicting an exemplary network 300 related to the current disclosure. The network 300 comprises a plurality of mobile devices 301-303 configured for communicating with a core network 310 via a wireless Local Area Network (LAN) 305. The LAN 305 comprises base stations 311-313. The base stations provide mobile devices with connectivity for forwarding received signals to the network 310. Each of the mobile devices 301-303 may communicate with one or more of the base station 311-313 via a THz frequency.

In one embodiment, the service provider may implement the current method in the mobile devices 301-303 and base stations 311-313. That is, the service provider may implement transceivers with a fly's eye structure in the mobile devices and base stations. A beam steering device is positioned in front of a detector in the fly's eye structure. A controller in the mobile device or base station then determines if a received signal is out of focus. For example, signals received from two of ten detectors may be out of focus. The two signals that are out of focus may then need corrective action. The controller may then apply a corrective signal to the beam steering device that corresponds to the detector whose signal is out of focus. For example, the controller may adjust the pattern of phase variation in one or more holographic filters or the angle of one or more micro-mirrors, thereby adjusting the focusing power of the received terahertz signal. For example, the beam steering devices associated with the two detectors that received an out of focus signal are identified. The method then applies an appropriate corrective signal such that a focused signal is received by their respective detectors.

Those skilled in the art will realize that although only three mobile devices, three base station and one LAN are depicted in FIG. 3, the communication system 300 can be expanded by including any number of mobile devices, access networks, network elements, without altering the scope of the present disclosure.

Figure 4:
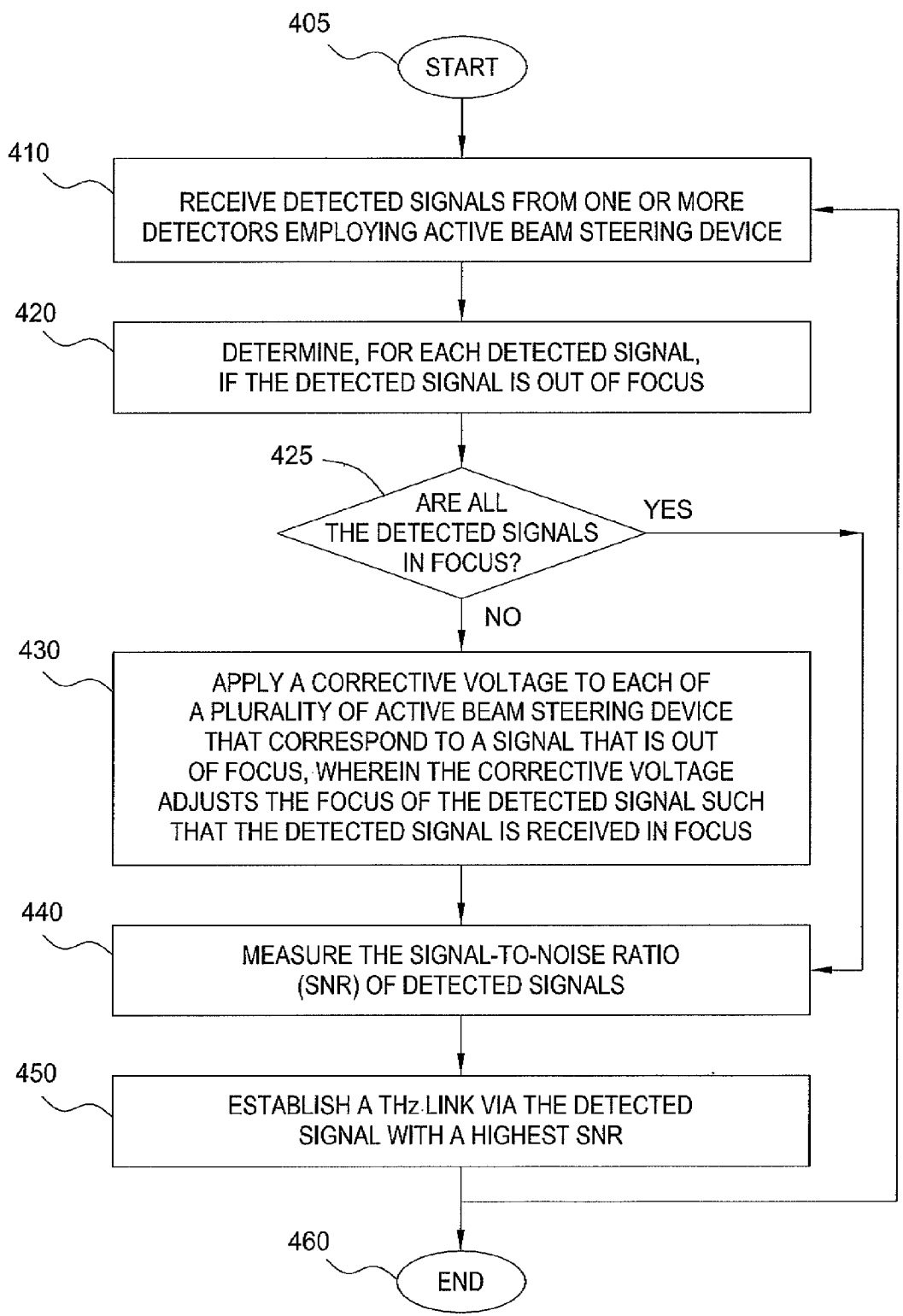
FIG. 4 illustrates a flowchart of a method for providing communication using a THz link.

FIG. 4 illustrates a flowchart of a method 400 for providing communication using a THz link. In one embodiment, one or more steps of method 400 can be implemented in a mobile device or a base station. For example, the method 400 may be performed by a controller in a mobile device or a base station. Method 400 starts in step 405 and proceeds to step 410.

In step 410, method 400 receives detected THz signals from one or more detectors employing an active beam steering device. For example, an active beam steering device may be employed by each of a plurality of detectors in a transceiver with a fly's eye structure. The active beam steering device (broadly a steering device employing at least one active beam steering filter) is positioned in front of a THz signal detector. The controller may then receive detected THz signals from each of the one or more detectors in the fly's eye structure.

In step 420, method 400 determines, for each of the detected THz signals, if the detected THz signal is out of focus. For example, one or more of the THz signals may be received but with an offset from the optical axis 228.

In step 425, method 400 determines if all the detected signals are in focus. If all the detected THz signals are in focus (no detected signal is out of focus), the method proceeds to step 440. Otherwise, the method proceeds to step 430.

In step 430, method 400 applies a signal to each of a plurality of active beam steering device that correspond to a THz signal that is out of focus, wherein the corrective signal adjusts the focus of the detected THz signal such that the detected signal is received in focus, or to a greater degree of focus if the offset is too great to be fully corrected. For example, the controller may adjust the pattern of phase variation of the holographic filter (or an angle of a micro-mirror) associated with the detector that received the out of focus signal such that a focused signal is received by the corresponding detector.

In step 440, method 400 measures the Signal-to-Noise Ratio (SNR) of detected signals. For example, the method may have received several signals in focus but they may have different SNRs. In another example, some signals may have been received via a corrective action (via the active beam steering device) while other signals were in focus without any corrective action. SNRs are then measured for all the received signals from all the detectors.

In step 450, method 400 establishes a THz link via the detected signal with a highest SNR. For example, the method selects the detected signal with a highest SNR and the THz link between two devices (e.g., a mobile device and a base station) is established over the selected signal. It is important to note that the selected signal may be a signal received via a corrective action or without the corrective action. It should be noted that there may be a feedback path between steps 430 and 440, where the measured SNR can be used to fine tune the amount of correction to apply to each of the holographic lens.

The method then proceeds to step 460 to end processing the detected signals or alternatively to step 410 to continue receiving more detected signals.

It should be noted that although not specifically specified, one or more steps of method 400 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 4 that recite a determining operation or involve a decision, do not necessarily require that both branches of the determining operation be practiced. In other words, one of the branches of the determining operation can be deemed as an optional step.

It should be noted that the mobile device may comprise various user interfaces for facilitating communication. For example, a user interface may include a physical button or key on the mobile device for selecting frequency spectrum, e.g. THz versus cellular.

In one embodiment, an active beam steering filter can be implemented via an electrically controllable micro-mirror surface, where the optical properties of the THz signals transmitting through or reflecting from the electrically controllable micromirror surface can be controlled to redirect the received terahertz signal to a common convergence point (focus) at the receiver. By dynamically controlling the optical properties of a surface on a microscopic scale, in transmission mode, it is possible to steer the outward going direction of the THz beams, or conversely the view direction of THz sensors.

Figure 7:
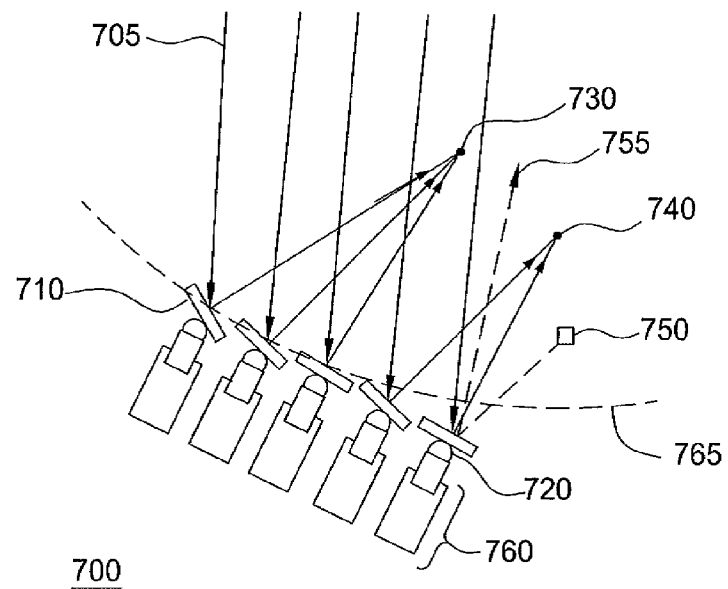
FIG. 7 illustrates an exemplary micro-mirror array.

FIG. 7 illustrates an exemplary micro-mirror array 700. It should be noted that FIG. 7 is not drawn to scale and should not be interpreted to be a perfect illustration of the exact principles of optics. In one embodiment, the micro-mirror array 700 comprises one or more micro-mirrors 710 that are each mounted to a motor 720 and a motor 760, e.g., a piston like device. Each of the motors 720 (e.g., used to provide focus control by tilting a micro mirror) and 760 (e.g., used to provide phase control by raising or lowering a micro mirror) can be independently controlled via a controller. It should be noted that FIG. 7 also illustrates a virtual spherical surface curve 765 of equal phase length. This virtual spherical surface curve 765 of equal phase length can be adjusted via the operation of the pertinent motors 760 of the pertinent micro mirrors. In one embodiment, the THz signal 705 can be focused to a common point 730. More specifically, the micro mirrors can individually tilt to different angles to converge incoming parallel rays to a common point of convergence. However, in one embodiment, different portions of the THz signal can be directed different focus points, e.g., 730 and 740. Similarly, although FIG. 7 is illustrated as redirecting a received THz signal in a receiver to a common point, FIG. 7 can also be viewed as a THz source 750 that is transmitting a THz signal 755 that is being directed or aimed by the micro-mirrors 720.

In one embodiment, a digital micro-mirror array device may have a plurality of micro-mirror surfaces implemented on an optical semiconductor that includes on its surface, multiple (e.g., several hundred to many thousands) of microscopic mirrors arranged, e.g., in a rectangular array. The THz beam is directed onto the micro-mirror surface. Individual micro-mirrors within this array can be programmed and controlled using linear displacement and tilt to individually direct their part of the intercepted THz beam to a point of common convergence (focus) at the receiver. In one embodiment, since the micro-mirrors are flat, they cannot individually focus their intercepted portion of the collimated THz beam, but they can redirect a portion of the THz field impinging upon them by adjusting the phase and direction of the energy toward a common point of convergence. The physical size of the micro-mirrors commonly measured in microns and the resulting energy reflected from each of the small mirrors would itself be measured in microns. However the array of mirrors can direct the energy toward an area consistent with the size of a terahertz metallic antenna "driven" element, thus effectively matching the energy distribution to the aperture of the element. Examples of such mirror arrays are miniaturized computer image projection elements (Texas Instruments' Digital Light Processing modules).

Each micro-mirror element at the transmitter or receiver acts as an individual far field source (from the perspective of the opposite end of the link), and thus its displacement and tilt must be optimized to deliver its component of the THz beam to the common convergence point in phase and consequently minimizing destructive interference. The micro-mirrors can be steered independently from each other, under computer control to form an "optimized segmented optical surface" to deliver all the intercepted THz energy into a common convergence point at the THz receiver.

In one embodiment, the mirrors can be individually rotated by a number of degrees (e.g., 10-12°). Individual mirrors are commonly mounted on a yoke that is connected to support posts by hinges (e.g., compliant torsion hinges) that are themselves mounted on a motor structure that provides phase correction and directional adjustment. The motor controls the position of its associated mirror by electrostatic or magnetic means. In one embodiment, to move individual mirrors, a state is loaded into a memory cell (e.g., static random access memory 232) associated with a corresponding mirror. In an exemplary embodiment, the memory cell's digital representation of displacement or tilt is converted into an analog voltage which charges two surfaces within an electrostatic motor connected to the mirror, causing it to move. As long as the charge remains, thereby the position of the corresponding mirror is maintained. A controller (e.g., processor 231 of FIG. 2) loads the memory cells to establish corresponding charges to effectuate target mirror positions. By "scanning" the mirror displacement/tilt values into the memory, the mirrors may essentially move at the same instant.

Alternatively, the active beam steering device may employ a holographic filter. It should be noted that since a hologram is inherently bi-directional and has no effect apart from possible polarization effects, a modulated light source would pass though the "hologram" device in either direction unaffected except for its direction. Thus, a modulated source beam could enter and be redirected by a suitably active and rewritable hologram.

In one embodiment, the programmable active "hologram" may also be capable of generating a hologram pattern that would break up the initial beam into outgoing multiple "beamlets" each with the capability of being dynamically steered by the active hologram pattern. In addition to the above-described use of a single dedicated high bandwidth electromagnetic source in broadcast mode, in one embodiment of a THz communications system, a rewritable hologram is written to transmit and receive multiple coherent and independently modulated source beams. These independently modulated source beams are spatially orthogonal to each other, allowing separate transmissions to be routed into a "target" area and received by individual targets (transceivers) within a selected area providing for multiple dedicated transmitters and receivers that are spatially to isolate the sensitive receiver from a nearby powerful transmitter. Such a multi-source/multi-beam arrangement significantly improves throughput capacity. The number of sources and resulting outgoing link beams is only limited by the needed receiver power at the individual receiver target, the hologram's display resolution, fringe calculation rate and the holographic display's rewrite rate.

In one embodiment, a rewritable holographic display suitable for THz applications has low loss at the THz wavelengths, fast response, and strong diffractive response at THz frequencies. The fringe spacing required to effectively diffract THz frequencies is considerably larger than those required for visible light, due to the difference in wavelength size and which may ease fabrication. For THz applications, a silica medium may be used, allowing display fabrication techniques similar to visible spectrum display manufacturing methods. In one embodiment, reflective properties of colloidally suspended metal particles in a liquid crystal medium may lead to suitable dynamic fringe medium, as long as the liquid crystal or fluid medium is transparent to THz wavelengths.

In one embodiment, an exemplary holographic medium is a photorefractive polymer composite, i.e., a polymer composite that absorbs light at a particular wavelength. When an interference pattern from a writing laser strikes it, the polymer generates positive and negative charge carriers to thereby generate an electrical field that changes the refractive index of the material. The holographic medium is rewritable to change the refractive index to steer a THz beam. In an alternate embodiment, a SLM can be employed to generate the holograms.

In one embodiment, a controller (e.g., processor 231 of FIG. 2) calculates a holographic fringe pattern that it then uses to set the optical properties of the holographic medium. The holographic medium then diffracts the THz wave to yield a target THz wavefront.

In one embodiment, a hologram fringe pattern is considered a diffractive optical element capable of bending a ray path. This effect is bidirectional and a returning ray path from the target receiving device is similarly diffracted back to the originating transmitter. In one embodiment, the transmitter is isolated from, but colocated with the receiver, thus making the holographic display capable of duplex transmit and receive steering antenna.

Figure 5:
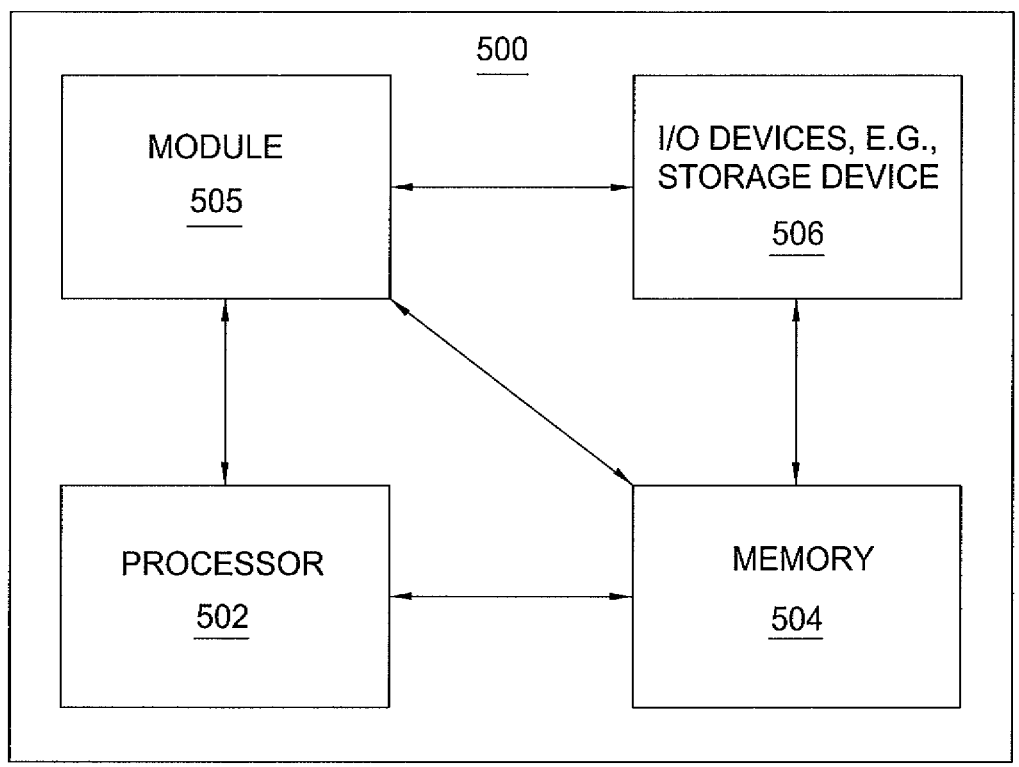
FIG. 5 illustrates a high-level block diagram of a mobile device suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU or a controller), a memory 504, e.g., random access memory (RAM) and/or read only memory (ROM), a module 505 for providing communication using a THz link, and various input/output devices 506 (e.g., storage devices, including but not limited to, a tape drive, a floppy drive, a hard disk drive or a compact disk drive, a receiver as discussed above, a transmitter as discussed above, a transceiver as discussed above, a speaker, a display, a speech synthesizer, an output port, and a user input device (such as a keyboard, a keypad, a mouse, alarm interfaces, power relays and the like)).

It should be noted that the present disclosure can be implemented in a combination of software and hardware, e.g., using application specific integrated circuits (ASIC), a general-purpose computer or any other hardware equivalents. In one embodiment, the present module or process 505 for providing communication using a THz link can be loaded into memory 504 and executed by processor 502 to implement the functions as discussed above. As such, the present method 505 for providing communication using a THz link (including associated data structures) of the present disclosure can be stored on a non-transitory computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for establishing a terahertz link, comprising:
receiving, by a processor, detected terahertz signals from a plurality of detectors, where an active beam steering device is deployed with each of the detectors;
determining, by the processor, for each of the detected terahertz signals, if the detected terahertz signal is out of focus from a focus point;
applying, by the processor, a corrective signal to each active beam steering device that corresponds to a detected terahertz signal that is out of focus from the focus point, wherein the corrective signal causes the detected signal to be redirected;
measuring, by the processor, a signal-to-noise ratio of each of the detected terahertz signals; and
establishing the terahertz link via one of the detected terahertz signals with a highest signal-to-noise ratio.

2. The method of claim 1, wherein the receiving the detected terahertz signals is performed by a cluster of the detectors having a combined field of view that is hemispherical.

3. The method of claim 1, wherein each active beam steering device is deployed in front of a respective detector of the plurality of detectors.

4. The method of claim 1, wherein the each active beam steering device comprises a holographic filter.

5. The method of claim 4, wherein the applying of the corrective signal comprises adjusting a pattern of phase variation of the holographic filter of each of the active beam steering devices that corresponds to a detected terahertz signal that is out of focus.

6. The method of claim 1, wherein each of the active beam steering devices comprises a plurality of micro-mirrors.

7. The method of claim 6, wherein the applying of the corrective signal comprises adjusting an angle of each of the mirco-mirrors.

8. The method of claim 1, wherein the detected terahertz signals are transmitted by a transmitter, with each of the detected terahertz signals being aimed outward from a center of a spherical structure.

9. The method of claim 1, wherein the detected terahertz signals are received by a mobile device.

10. The method of claim 1, wherein the detected terahertz signals are received by a base station.

11. A tangible computer-readable storage medium having storing instructions which, when executed by a processor, cause the processor to perform operations for establishing a terahertz link, the operations comprising:
    receiving detected terahertz signals from a plurality of detectors, where an active beam steering device is deployed with each of the detectors;
    determining, for each of the detected terahertz signals, if the detected terahertz signal is out of focus from a focus point;
    applying a corrective signal to each active beam steering device that corresponds to a detected terahertz signal that is out of focus from the focus point, wherein the corrective signal causes the detected terahertz signal to be redirected;
    measuring a signal-to-noise ratio of each of the detected terahertz signals; and
    establishing the terahertz link via one of the detected terahertz signals with a highest signal-to-noise ratio.

12. The tangible computer-readable storage medium of claim 11, wherein the receiving the detected terahertz signals is performed by a cluster of the detectors having a combined field of view that is hemispherical.

13. The tangible computer-readable storage medium of claim 11, wherein each active beam steering device is deployed in front of a respective detector of the plurality of detectors.

14. The tangible computer-readable storage medium of claim 11, wherein each of the active beam steering devices comprises a holographic filter.

15. The tangible computer-readable storage medium of claim 14, wherein the applying of the corrective signal comprises adjusting a pattern of phase variation of the holographic filter of each of the active beam steering devices that corresponds to a detected terahertz signal that is out of focus.

16. The tangible computer-readable storage medium of claim 11, wherein each of the active beam steering devices comprises a plurality of micro-mirrors.

17. The tangible computer-readable storage medium of claim 16, wherein the applying of the corrective signal comprises adjusting an angle of each of the micro-mirrors.

18. The tangible computer-readable storage medium of claim 11, wherein the detected terahertz signals are transmitted by a transmitter, with each of the detected terahertz signals being aimed outward from a center of a spherical structure.

19. A receiver, comprising:
    a plurality of active beam steering devices;
    a plurality of detectors, for receiving a plurality of terahertz signals, wherein one of the plurality of active beam steering devices is arranged with a corresponding one of the plurality of detectors to form a respective combination, wherein if one of the terahertz signals is received by a respective combination and is out of focus from a focus point, then a controller applies a corrective signal to a corresponding active beam steering device that corresponds to the one terahertz signal that is out of focus from the focus point, wherein the corrective signal causes the one terahertz signal to be redirected onto a respective detector; and
    a processor for measuring a signal-to-noise ratio of each of the of terahertz signals and for establishing a terahertz link via one of the terahertz signals with a highest signal-to-noise ratio.

20. The receiver of claim 19, wherein each of the active beam steering devices comprises a holographic filter.

* * * * *